US012695179B2

(12) United States Patent
Suda et al.

(10) Patent No.: US 12,695,179 B2
(45) Date of Patent: Jul. 28, 2026

(54) VEHICLE ANTENNA DEVICE

(71) Applicant: HARADA INDUSTRY CO., LTD., Tokyo (JP)

(72) Inventors: Yoshihisa Suda, Tokyo (JP); Junichi Kawahata, Tokyo (JP); Yuki Takahashi, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 210 days.

(21) Appl. No.: 18/728,386

(22) PCT Filed: Jan. 13, 2023

(86) PCT No.: PCT/JP2023/000716
§ 371 (c)(1),
(2) Date: Dec. 5, 2024

(87) PCT Pub. No.: WO2023/136315
PCT Pub. Date: Jul. 20, 2023

(65) Prior Publication Data

US 2025/0329922 A1 Oct. 23, 2025

(30) Foreign Application Priority Data

Jan. 14, 2022 (JP) ................................ 2022-004083

(51) Int. Cl.
*H01Q 1/32* (2006.01)
*H01Q 1/48* (2006.01)
*H01Q 9/04* (2006.01)

(52) U.S. Cl.
CPC ............ *H01Q 1/3291* (2013.01); *H01Q 1/48* (2013.01); *H01Q 9/0414* (2013.01)

(58) Field of Classification Search
CPC ...... H01Q 1/3291; H01Q 1/3275; H01Q 1/48; H01Q 1/1207; H01Q 9/0414; H01Q 9/42; H01Q 5/40
See application file for complete search history.

(56) References Cited

U.S. PATENT DOCUMENTS 11,342,670 B1 * 5/2022 Yang ........................ H01Q 9/42
2011/0074648 A1 * 3/2011 Shinkawa ............. H01Q 21/30 343/866

(Continued)

FOREIGN PATENT DOCUMENTS

DE 102009041166 A1 * 3/2011 .......... H01Q 1/3275
JP 2004128660 A 4/2004

(Continued)

OTHER PUBLICATIONS

International Search Report in PCT/JP2023/000716, dated Mar. 7, 2023.

*Primary Examiner* — Awat M Salih
(74) *Attorney, Agent, or Firm* — Spencer Fane LLP

(57) ABSTRACT

A vehicle antenna device includes a plate-like element and a ground substrate. The plate-like element has a feed part and a leading end part extending a predetermined line width from the feed part to the leading end part to define a blank part at its center as viewed from above. The plate-like element has an open part extending from the blank part between the feed part and the leading end to transmit and receive signals of a predetermined frequency band. The ground substrate has a ground part serving as a ground of the plate-like element and a feed point connected with the feed part of the plate-like element and is disposed such that a large part of the ground part does not overlap the plate-like element as viewed from above and does not run off the range defined by the blank part and the open part.

18 Claims, 6 Drawing Sheets

(56) References Cited

U.S. PATENT DOCUMENTS

| | | | | |
|---|---|---|---|---|
| 2012/0146856 | A1* | 6/2012 | Tanaka | H01Q 1/38<br>343/700 MS |
| 2012/0162022 | A1* | 6/2012 | Wei | H01Q 9/42<br>343/700 MS |
| 2019/0273311 | A1 | 9/2019 | Sampo et al. | |
| 2020/0350688 | A1 | 11/2020 | Ambe et al. | |

FOREIGN PATENT DOCUMENTS

| | | | |
|---|---|---|---|
| JP | 2007049249 | A | 2/2007 |
| JP | 2019140569 | A | 8/2019 |
| WO | 2018/110671 | A1 | 6/2018 |

* cited by examiner

[FIG. 1]
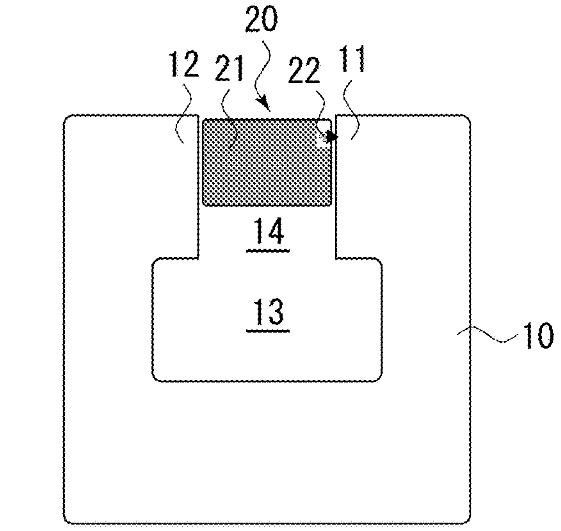
[FIG. 2]
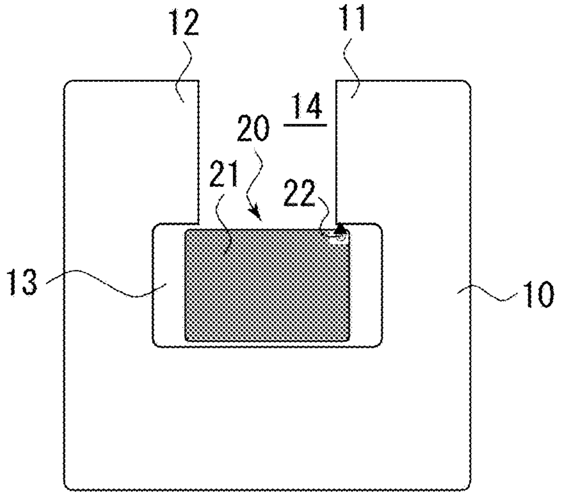
[FIG. 3]
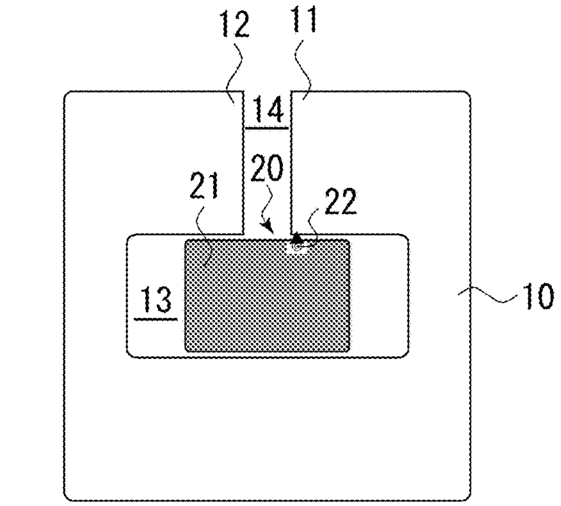

[FIG. 4]
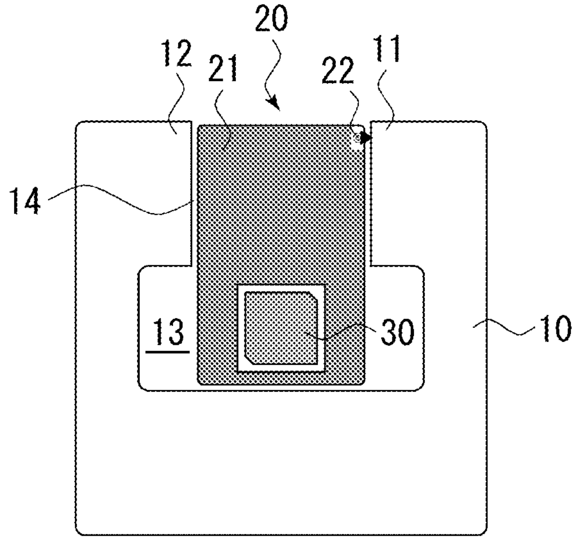
[FIG. 5]
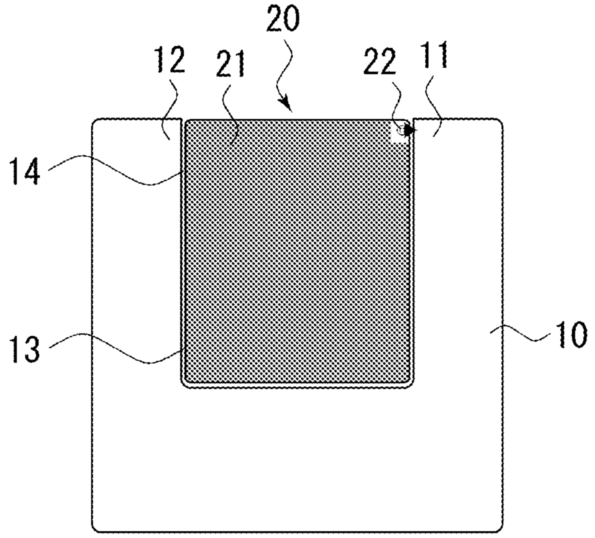
[FIG. 6]
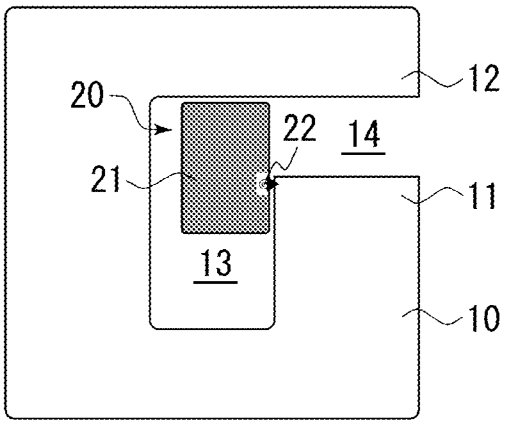

[FIG. 7]
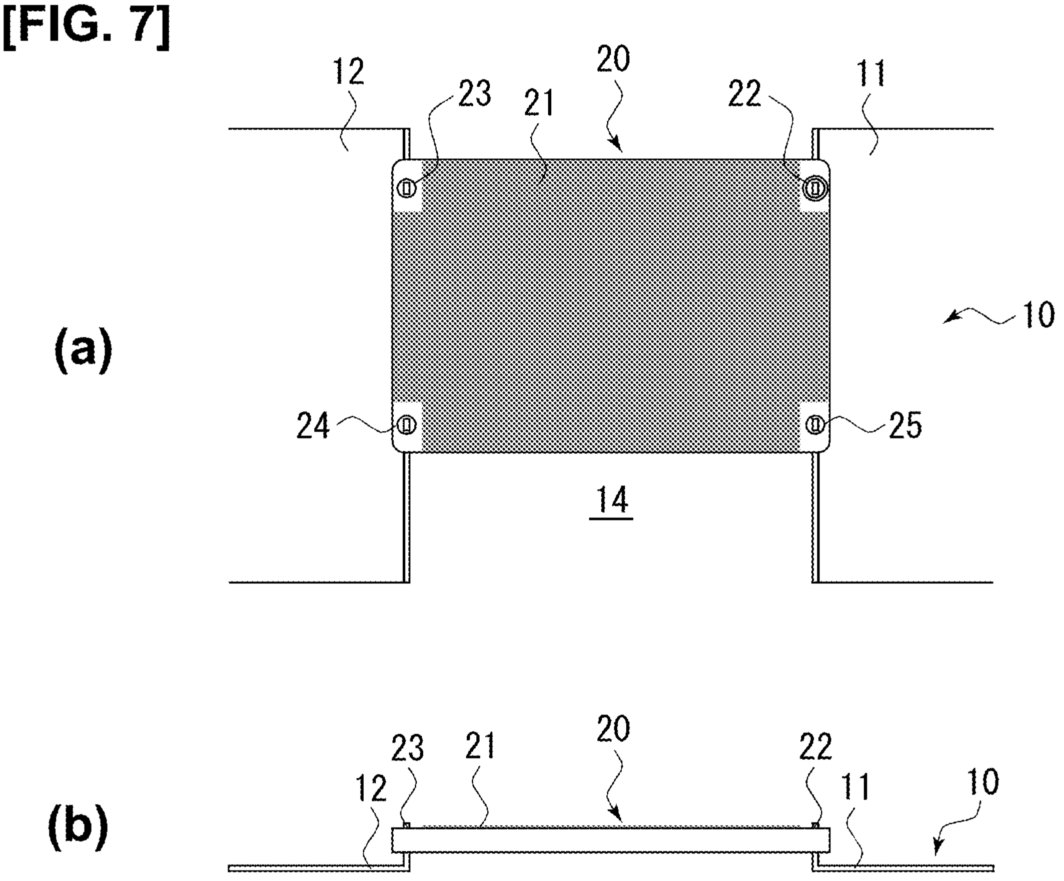
[FIG. 8]
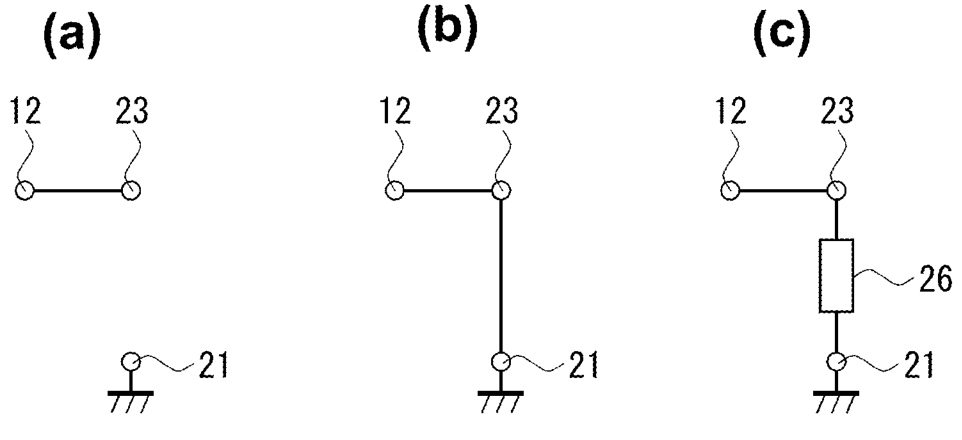

[FIG. 9]
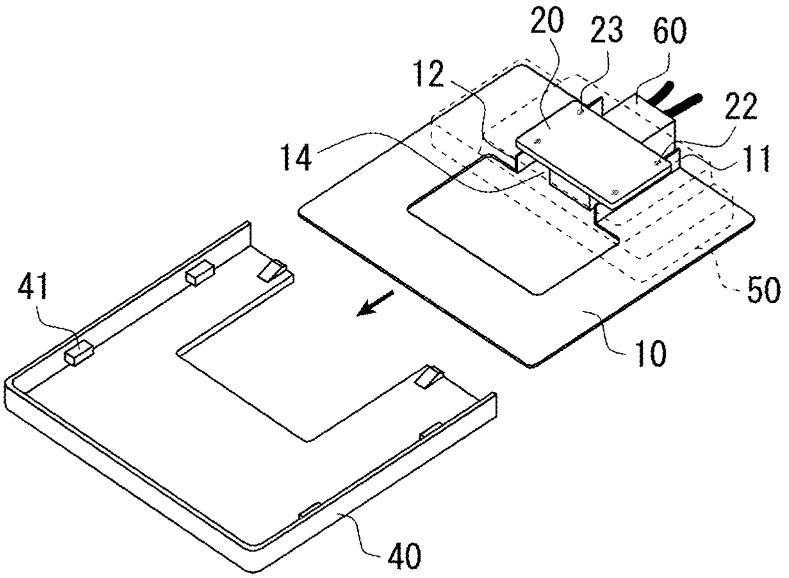
[FIG. 10]
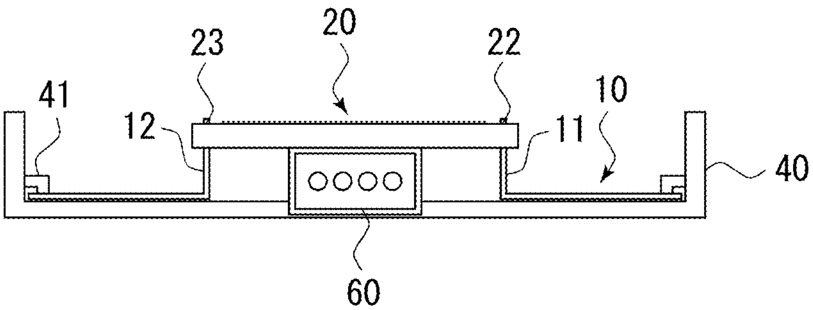

[FIG. 11]
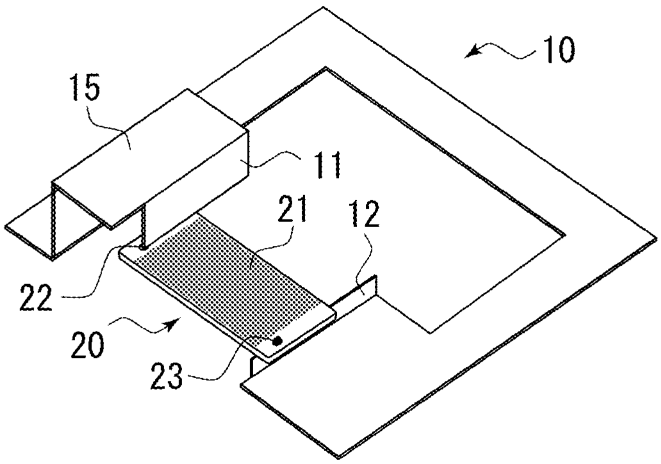
[FIG. 12]
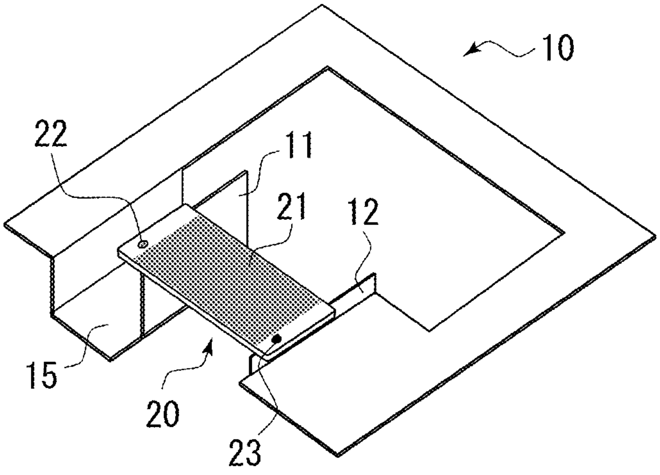

[FIG. 13]
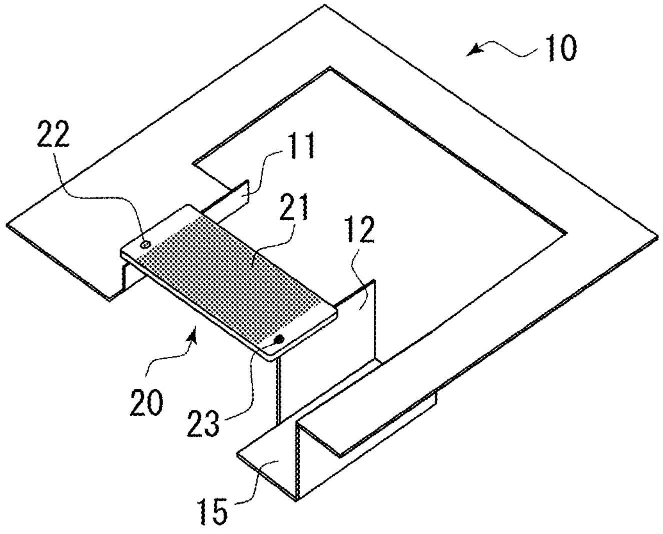
[FIG. 14]
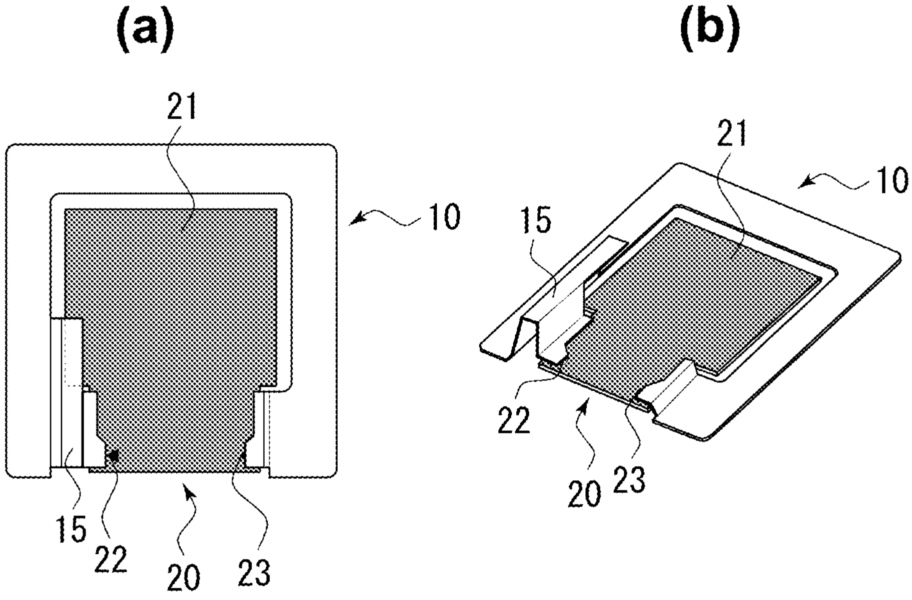

VEHICLE ANTENNA DEVICE

CROSS-REFERENCE TO RELATED APPLICATIONS

This application is a U.S. national stage application of International Application No. PCT/JP2023/000716, filed on Jan. 13, 2023. This application claims priority to Japanese Patent Application No. 2022-004083, filed on Jan. 14, 2022.

BACKGROUND

Technical Field

The present invention relates to a vehicle antenna device and, more particularly to a vehicle antenna device easy to manufacture and capable of attaining a broad bandwidth.

Background Information

A TEL antenna that can be installed in a vehicle instrument panel has conventionally been known as a vehicle antenna device. Typically, such a type of antenna device is constituted by a combination of a sheet metal serving as a ground and an antenna element and installed in a vehicle instrument panel after being inserted into an insulating bracket. The size and shape of the sheet metal serving as a ground is determined by the shape of the insulating bracket determined by vehicle manufacturers.

For example, the antenna device disclosed in PCT International Publication No. 2018/110671 (herein after referred to as Patent Document 1) has a resonance antenna element that resonates in a plurality of frequency bands disposed at a partially cut part of a sheet metal serving as a ground.

SUMMARY

Upon assembly to an insulating bracket, such an antenna device for vehicle instrument panels is inserted into the insulating bracket with the sheet metal slid while being held from the side. However, in the case of an antenna device like that disclosed in Patent Document 1 having a structure in which the sheet metal is partially cut, the sheet metal may be caught by the insulating bracket during sliding insertion thereof due to its complicated shape. Further, due to its partially cut structure, the sheet metal may be bent upon being held from the side, which in turn may change antenna transmission/reception characteristics. Therefore, there is required development of an antenna device easy to manufacture with an uncomplicated assembly process.

Besides, further bandwidth widening is recently required for the TEL antenna and, to this end, the size of an antenna element is required to be made as large as possible within a restricted range. Furthermore, it becomes important to adjust antenna transmission/reception characteristics from low frequency to high frequency bands depending on the type of a vehicle on which an antenna device is mounted. Therefore, development of an antenna device capable of easily adjusting antenna transmission/reception characteristics is also required.

The present invention has been made in view of the above circumstances, and an object thereof is to provide a vehicle antenna device easy to manufacture, capable of attaining a broad bandwidth, and capable of easily adjusting antenna transmission/reception characteristics.

To attain the above object of the present invention, a vehicle antenna device according to the present invention includes: a plate-like element having a feed part and a leading end part, extending with a predetermined line width from the feed part to the leading end part so as to define a blank part at its center as viewed from above, further having an open part extending from the blank part between the feed part and the leading end part, and being configured to transmit and receive signals of a predetermined frequency band: and a ground substrate having a ground part serving as a ground of the plate-like element and a feed point connected with the feed part of the plate-like element and being disposed such that a large part of the ground part does not overlap the plate-like element as viewed from above and does not run off the range defined by the blank part and the open part.

The plate-like element may have a C-shape, G-shape, or U-shape.

The ground substrate may extend in the open part.

The ground substrate may extend in the blank part.

The vehicle antenna device may further include an insulating bracket having a slide part to which the plate-like element is inserted from the opposite side of the open part of the plate-like element while being slid in parallel to the plate surface of the plate-like element, wherein the ground substrate bridges the open part of the plate-like element so as to prevent the plate-like element from being bent when it is inserted into the slide part while being laterally held.

The vehicle antenna device may further include a substrate cover covering the ground substrate and fixed to the plate-like element to bridge the open part of the plate-like element so as to prevent the plate-like element from being bent when it is laterally held.

The vehicle antenna device may further include a connector disposed on the ground substrate and connected with a signal transmission/reception cable, wherein the ground substrate is disposed so as to be offset to the side at which the connector does not protrude from the plate-like element so as to adjust the protruding amount of the connector from the plate-like element.

The plate-like element may allow adjustment of signal transmission/reception characteristics in a predetermined frequency band by the line width.

The ground substrate may have a fixing point fixed with the leading end part of the plate-like element.

The feed part and leading end part of the plate-like element may be bent respectively at right angles so as to be erected, and the bent ends may be connected respectively to the feed point and the fixing point of the ground substrate.

The fixing point fixed with the leading end part of the plate-like element may be electrically connected to the ground part of the ground substrate.

The fixing point of the ground substrate fixed with the leading end part of the plate-like element may be electrically connected to the ground part of the ground substrate through a resistor of a predetermined impedance value.

The ground substrate may be designed such that one of the following three options is selectable: the fixing point thereof fixed to the leading end part of the plate-like element is electrically connected to the ground part thereof directly: the fixing point is electrically connected to the ground part through a resistor of a predetermined impedance value: and the fixing point is electrically opened from the ground part.

The plate-like element may have a folded part that is bent so as to be erected and then folded back.

The leading end of the folded part which is constituted by being bent so as to be elected and then fold back, may be connected, at its end edge, to the feed point of the ground substrate as the feed part.

The plate-like element may have a folded part that is bent so as to be erected and then folded back, and the leading end of the folded part which is constituted by being bent so as to be elected and then fold back, is connected to the fixing point of the ground substrate as the leading end part.

The folded part may overlap a part of the ground part as viewed from above.

The vehicle antenna device may further include another antenna element disposed so as not to overlap the plate-like element as viewed from above and not to run off the range defined by the blank part and the open part.

Advantageous Effects of the Invention

The vehicle antenna device according to the present invention has advantages of being easy to manufacture, capable of attaining a broad bandwidth, and capable of easily adjusting antenna transmission/reception characteristics.

BRIEF DESCRIPTION OF THE DRAWINGS

Referring now to the attached drawings which form a part of this original disclosure, illustrative embodiments are shown.

FIG. 1 is a schematic top view for explaining a vehicle antenna device according to an illustrated embodiment.

FIG. 2 is a schematic top view for explaining another arrangement example of a ground substrate of the vehicle antenna device according to the illustrated embodiment.

FIG. 3 is a schematic top view for explaining another example of the plate-like element of the vehicle antenna device according to the illustrative embodiment.

FIG. 4 is a schematic top view for explaining still another arrangement example of the ground substrate of the vehicle antenna device according to the illustrative embodiment.

FIG. 5 is a schematic top view for explaining another shape of the plate-like element of the vehicle antenna device according to the illustrative embodiment.

FIG. 6 is a schematic top view for explaining still another shape of the plate-like element of the vehicle antenna device according to the illustrative embodiment.

FIGS. 7A and 7B are schematic enlarged views for explaining details of a connection portion between the plate-like element and the ground substrate in the vehicle antenna device according to the illustrative embodiment.

FIGS. 8A, 8B and 8C are schematic circuit diagrams for explaining various configurations of the fixing point of the ground substrate in the vehicle antenna device according to the illustrative embodiment.

FIG. 9 is a schematic perspective view for explaining an example in which the vehicle antenna device according to the illustrative embodiment is assembled to an insulating bracket for an instrument panel.

FIG. 10 is a schematic side view for explaining an example in which the vehicle antenna device according to the illustrative embodiment is assembled to the insulating bracket for an instrument panel.

FIG. 11 is a schematic perspective view for explaining an example in which the plate-like element of the vehicle antenna device according to the illustrative embodiment is three-dimensionally formed.

FIG. 12 is a schematic perspective view for explaining another example in which the plate-like element of the vehicle antenna device according to the illustrative embodiment is three-dimensionally formed.

FIG. 13 is a schematic perspective view for explaining still another example in which the plate-like element of the vehicle antenna device according to the illustrative embodiment is three-dimensionally formed.

FIGS. 14A and 14B are schematic views for explaining yet another example in which the plate-like element of the vehicle antenna device according to the illustrative embodiments is three-dimensionally formed.

DETAILED DESCRIPTION OF EMBODIMENTS

Hereinafter, an embodiment for practicing the present invention will be described together with illustrated examples. FIG. 1 is a schematic top view for explaining a vehicle antenna device according to the present invention. As illustrated, the vehicle antenna device according to the present invention mainly includes a plate-like element 10 and a ground substrate 20.

The plate-like element 10 can transmit/receive signals of a predetermined frequency band. The plate-like element 10 is constituted by a conductive metal plate such as a copper plate. The predetermined frequency band mentioned here may be, for example, a TEL band, specifically, wide frequency bands covering 700 MHz to 960 MHz and 1710 MHz to 5000 MHz. However, the present invention is not limited to these frequency bands, but it is possible to constitute the plate-like element 10 according to a desired frequency band by variously adjusting the element length thereof.

The plate-like element 10 has a feed part 11 and a leading end part 12. As illustrated, the plate-like element 10 extends from the feed part 11 to the leading end part 12 with a predetermined line width so as to define a blank part 13 at its center as viewed from above. Specifically, the plate-like element 10 has a C-shape. That is, the plate-like element 10 extends in a C-shape within a quadrangular range as illustrated. The C-shaped plate-like element 10 has an open part 14 at the opposing portion between the feed part 11 and the leading end part 12. The open part 14 extends from the blank part 13 between the feed part 11 and the leading end part 12. That is, the blank part 13 and the open part 14 extend inside the quadrangular range of the plate-like element 10. Thus, in the present specification, the blank part 13 refers to a center empty space surrounded by the plate-like element 10, and the open part 14 refers to an empty space sandwiched between the feed part 11 and the leading end part 12.

The ground substrate 20 has a ground part 21 and a feed point 22. The ground part 21 serves as a ground of the plate-like element 10. The feed point 22 is connected with the feed part 11 of the plate-like element 10. The ground substrate 20 may be constituted by a circuit board such as a glass epoxy substrate: however, the present invention is not limited to this, and any member may be employed as the ground substrate 20 as long as it is a plate-like one that can provide the ground part and the feed point.

As illustrated, the ground substrate 20 is disposed such that the ground part 21 does not overlap the plate-like element 10 as viewed from above and does not run off the range defined by the blank part 13 and the open part 14. Specifically, the ground substrate 20 is disposed within the range surrounded by the C-shaped plate-like element 10. More specifically, in the illustrated example, the ground substrate 20 extends in the open part 14. The ground substrate 20 is thus disposed in the open part 14 to bridge the open part. Although the ground part 21 is disposed so as not to completely overlap the plate-like element 10 in the illustrated example, the present invention is not limited to this. The ground substrate 20 of the vehicle antenna device according to the present invention only needs to be disposed such that a large part of the ground part 21 does not overlap the plate-like element 10, and the ground part 21 may partially overlap the plate-like element 10 insofar as it does not affect the desired frequency band.

In the thus configured vehicle antenna device according to the present invention, the plate-like element 10 can easily be manufactured by sheet metal working. Further, when the plate-like element 10 is disposed so as to surround the ground substrate 20, the element length can be increased, allowing a broad bandwidth to be attained.

Next, another arrangement example of the ground substrate of the vehicle antenna device according to the present invention will be described using FIG. 2. FIG. 2 is a schematic top view for explaining another arrangement example of the ground substrate of the vehicle antenna device according to the present invention. In the drawings, the same reference numerals as those in FIG. 1 denote the same parts. In the example illustrated in FIG. 1, the ground substrate 20 extends in the open part 14 defined between the feed part 11 and the leading end part 12: on the other hand, in the example illustrated in FIG. 2, the ground substrate 20 extends in the blank part 13. Thus, the ground substrate 20 may be disposed only at the blank part 13 side as long as a large part of the ground part 21 does not overlap the plate-like element 10 and does not run off the range defined by the blank part 13 and the open part 14 as viewed from above.

Further, it is possible to adjust signal transmission/reception characteristics in a predetermined frequency band by reducing the width of the open part 14 defined between the feed part 11 and the leading end part 12 or changing the line width of the plate-like element 10. FIG. 3 is a schematic top view for explaining another example of the plate-like element of the vehicle antenna device according to the present invention. In the drawings, the same reference numerals as those in FIG. 1 denote the same parts. As illustrated in FIG. 3, it is possible to increase the element length of the plate-like element 10 by reducing the width of the open part 14. This enables adjustment of signal transmission/reception characteristics. Further, also by reducing or increasing the line width (e.g., a lateral or longitudinal width in the drawing) of the plate-like element 10, signal transmission/reception characteristics can be adjusted.

FIG. 4 is a schematic top view for explaining still another arrangement example of the ground substrate of the vehicle antenna device according to the present invention. In the drawings, the same reference numerals as those in FIG. 1 denote the same parts. As illustrated in FIG. 4, the ground substrate 20 extends both in the blank part 13 and the open part 14. However, also in this example, a large part of the ground part 21 does not overlap the plate-like element 10 and does not run off the range defined by the blank part 13 and the open part 14 as viewed from above.

Further, in the illustrated example, a patch antenna element 30 is disposed as another antenna element. The patch antenna element 30 is disposed so as not to overlap the plate-like element 10 as viewed from above and not to run off the range defined by the blank part 13 and the open part 14. Thus, another antenna element may be disposed so as to be surrounded by the plate-like element 10. Although the patch antenna element 30 is disposed on the ground substrate 20 in the illustrated example, the present invention is not limited to this. For example, the ground substrate 20 and the patch antenna element 30 may respectively be disposed in the open part 14 and the blank part 13.

Next, another shape example of the plate-like element will be described using FIG. 5. FIG. 5 is a schematic top view for explaining another shape example of the plate-like element of the vehicle antenna device according to the present invention. In the drawings, the same reference numerals as those in FIG. 1 denote the same parts. As illustrated in FIG. 5, the plate-like element 10 has a U-shape. That is, the plate-like element 10 extends in a U-shape within a quadrangular range as illustrated. As illustrated, in the plate-like element 10, neither the feed part 11 nor leading end part 12 extend inward, and thus the open part 14 is not narrowed. Also in this example, the ground substrate 20 is disposed so as to be surrounded by the U-shaped plate-like element 10.

Further, still another shape example of the plate-like element will be described using FIG. 6. FIG. 6 is a schematic top view for explaining still another shape example of the plate-like element of the vehicle antenna device according to the present invention. In the drawings, the same reference numerals as those in FIG. 1 denote the same parts. As illustrated in FIG. 6, the plate-like element 10 has a G-shape. That is, the plate-like element 10 extends in a G-shape within a quadrangular range as illustrated. In the C-shaped plate-like element 10 illustrated in FIG. 1 and the like, the feed part 11 and the leading end part 12 have symmetrical shapes. That is, the feed part 11 and the leading end part 12 are substantially the same in length. However, in the example illustrated in FIG. 6, the feed part 11 and the leading end part 12 are different in length and asymmetric. In the illustrated example, the feed part 11 is long, and the leading end part 12 is short. However, the present invention is not limited to this, and a configuration may be possible in which the feed part 11 and the leading end part 12 are short and long, respectively. Also in this example, the ground substrate 20 is disposed so as to be surrounded by the G-shaped plate-like element 10. Specifically, the ground substrate 20 is disposed in the blank part 13. The ground substrate 20 may be disposed at the open part 14 side.

Next, details of a connection portion between the plate-like element 10 and the ground substrate 20 will be described using FIGS. 7A and 7B. FIG. 7 are schematic enlarged views for explaining details of a connection portion between the plate-like element and the ground substrate in the vehicle antenna device according to the present invention. FIG. 7A is a top view, and FIG. 7B is a side view. As illustrated in FIG. 7A, the ground substrate 20 has a fixing point 23 fixed with the leading end part 12 of the plate-like element 10. As illustrated, the ground substrate 20 is disposed so as to partially overlap the feed part 11 and the leading end part 12. Further, in the illustrated example, the ground part 21 partially overlaps the plate-like element 10. However, a large part of the ground part 21 of the ground substrate 20 does not overlap the plate-like element 10. The fixing point 23 in the illustrated example is used for simply fixing the ground substrate 20 to the plate-like element 10. That is, the ground substrate 20 is fixed by the feed point 22 and the fixing point 23 so as to extend over the open part 14. In the illustrated example, the ground substrate 20 has, at its lower portion, other fixing points 24 and 25 fixed respectively with the feed part 11 and the leading end part 12. As a result, the ground substrate 20 is fixed securely to the plate-like element 10.

Further, as illustrated in FIG. 7B, the feed part 11 and leading end part 12 of the plate-like element 10 are bent at right angles so as to be erected, and the bent ends are connected respectively to the feed point 22 and the fixing point 23 of the ground substrate 20. This allows the plate-like element 10 and the ground substrate 20 to be easily connected by, e.g., sheet metal working of the plate-like element 10, where there is no need for separately provided wiring. Although the plate-like element 10 and the ground substrate 20 are disposed in parallel to each other in the illustrated example, the present invention is not limited to this. For example, the ground substrate may be disposed so as to be inclined.

The fixing point will be described in more detail using FIGS. 8A, 8B and 8C. FIGS. 8A, 8B and 8C are schematic circuit diagrams for explaining various configurations of the fixing point of the ground substrate in the vehicle antenna device according to the present invention. In the drawings, the same reference numerals as those in FIGS. 7A and 7B denote the same parts. FIG. 8A is a circuit diagram corresponding to the configuration illustrated in FIG. 7, which is an example in which the fixing point 23 of the ground substrate 20 fixed with the leading end part 12 of the plate-like element 10 is electrically opened from the ground part 21 of the ground substrate 20. However, the vehicle antenna device according to the present invention is not limited to this, and, as illustrated in FIG. 8B, the fixing point 23 may be electrically connected to the ground part 21. That is, the leading end part 12 may be short-circuited to the ground part 21. This changes antenna transmission/reception characteristics. As described above, antenna transmission/reception characteristics can be adjusted depending on whether the fixing point 23 is electrically connected to the ground part 21. Further, as illustrated in FIG. 8C, the fixing point 23 may be electrically connected to the ground part 21 through a resistor 26 of a predetermined impedance value. This means that the leading end part 12 may be connected to the ground part 21 through the resistor 26. Specifically, the resistor 26 having a resistance value of, e.g., 50Ω may be employed. Further, the resistor 26 may be formed by combining circuit elements having a plurality of resistance components such as reactance and capacitance. This can improve antenna transmission/reception characteristics, especially, VSWR characteristics.

Further, the vehicle antenna device according to the present invention may be designed such that one of the above three options is selectable: the fixing point 23 is electrically connected to the ground part 21 directly; the fixing point 23 is electrically connected to the ground part 21 through the resistor 26 of a predetermined impedance value: and the fixing point 23 is electrically opened from the ground part 21. To this end, for example, a jumper pin may be used to select a desired connection configuration. This allows adjustment of antenna transmission/reception characteristics according to the environment where the vehicle antenna device according to the present invention is used.

Next, an example in which the vehicle antenna device according to the present invention is assembled to an insulating bracket for an instrument panel will be described using FIG. 9. FIG. 9 is a schematic perspective view for explaining an example in which the vehicle antenna device according to the present invention is assembled to an insulating bracket for an instrument panel. In the drawings, the same reference numerals as those in FIG. 1 denote the same parts. As illustrated, an insulating bracket 40 is used in this example. The insulating bracket 40 is configured to be fixed to a vehicle instrument panel. The insulating bracket 40 has such a shape as to be able to house the quadrangular plate-like element 10. The insulating bracket 40 has a slide part 41 to which the plate-like element 10 is inserted from the opposite side of the open part 14 of the plate-like element 10 while being slid in parallel to the plate surface of the plate-like element 10. That is, the insulating bracket 40 holds, from both sides thereof, the plate-like element 10 slid so as to be guided by the slide part 41 to house therein the plate-like element 10. Further, the vehicle antenna device of the illustrated example has a connector 60. The connector 60 is configured to be connected with a signal transmission/reception cable. The illustrated connector 60 is disposed on the back surface side of the ground substrate 20.

When the plate-like element 10 is inserted into the slide part 41 while being held from the both sides of the insulating bracket 40, the open part 14 side of the plate-like element 10 having the C-shaped, G-shaped, or U-shaped open part 14 is held. At this time, in the vehicle antenna device according to the present invention, the ground substrate 20 is configured to bridge the open part 14 of the plate-like element 10 to prevent the plate-like element 10 from being bent. Specifically, as described using FIG. 7, the feed part 11 and the leading end part 12 are fixed respectively to the feed point 22 and the fixing point 23, with the result that the ground substrate 20 bridges the open part 14. This makes the plate-like element 10 have an O-shape as a whole, i.e., resistant to the lateral holding force, thus preventing the plate-like element 10 from being bent.

The insulating bracket 40 may, instead of having the slide part 41, have a structure in which the plate-like element 10 is pushed from above. In this case, for example, fixing holes are formed on the plate-like element 10 side, and bosses are provided at positions corresponding to the fixing holes on the insulating bracket 40 side. After the plate-like element 10 is pushed into the insulating bracket 40 from above, the bosses that have passed through the corresponding holes are melted by ultrasonic welding for fixing.

Further, in the illustrated example, a substrate cover 50 that covers the ground substrate 20 is denoted by a dashed line. The substrate cover 50 is used to cover the ground substrate 20 for insulation from the outside. In the vehicle antenna device according to the present invention, the substrate cover 50 is configured to be fixed to the plate-like element 10. This allows the substrate cover 50 to be used to bridge the open part 14 of the plate-like element 10 so as to prevent bending of the laterally held plate-like element 10. That is, the substrate cover 50 is used both for insulation and bending prevention. When the ground substrate 20 is fixed only by the feed point 22 and the fixing point 23, there is a risk of contact failure or the like due to lateral pressure applied when the plate-like element 10 is held; on the other hand, by bridging the open part 14 of the plate-like element 10 with the substrate cover 50, it is possible to further reduce a possibility of bending or contact failure.

As described above, by reducing or increasing the line width of the plate-like element 10, signal transmission/reception characteristics can be adjusted. In addition, the increase in the line width of the plate-like element 10 contributes to preventing bending of the plate-like element 10 as the plate-like element 10 is laterally held or to enhancing the strength.

Here, the arrangement position of the connector in the configuration using the insulating bracket 40 will be described with reference to FIG. 10. FIG. 10 is a schematic side view for explaining an example in which the vehicle antenna device according to the present invention is assembled to the insulating bracket for an instrument panel. In the drawings, the same reference numerals as those in FIG. 9 denote the same parts. FIG. 10 illustrates a state where the plate-like element 10 has been inserted into the insulating bracket 40. As illustrated, the vehicle antenna device according to the present invention has the connector

60. The connector 60 is connected with a signal transmission/reception cable. In the illustrated example, the connector 60 is disposed on the back surface side of the ground substrate 20. The ground substrate 20 is disposed at a predetermined height from the plate-like element 10 so as to adjust the downward protruding amount of the connector 60 from the plate-like element 10. That is, the ground substrate 20 is offset upward by the amount corresponding to the thickness of the connector 60 so as to prevent the connector 60 from protruding downward from the insulating bracket 40. Specifically, the feed part 11 and leading end part 12 of the plate-like element 10 are bent at right angles so as to be erected, and the length of each of them to be bent is adjusted in accordance with the target height of the ground substrate 20. In other words, the length of the erected part of each of the feed part 11 and the leading end part 12 may be adjusted according to the height of the connector 60. In the illustrated example, the connector 60 does not protrude downward from the plate-like element 10; however, the present invention is not limited to this, and the connector may protrude downward from the plate-like element depending on the shape or installation position of the insulating bracket.

When the vehicle antenna device according to the present invention is assembled to the insulating bracket 40, the connector 60 is disposed at the open part 14 side, so that the plate-like element 10 is inserted into the insulating bracket 40 from the opposite side of the open part 14 while being slid in parallel to the plate surface thereof. At this time, in the vehicle antenna device according to the present invention, the open part 14 is bridged with the ground substrate 20 and the substrate cover 50 so as to prevent the plate-like element 10 from being bent, which facilities assembly. Further, since the shape itself of the plate-like element 10 is not complicated, there is no fear that the plate-like element 10 is caught by the insulating bracket 40 upon insertion.

Although the connector 60 is disposed on the back surface side of the ground substrate 20 in the above illustrated example, the present invention is not limited to this. The connector is to be disposed on the ground substrate 20 depending on the shape or installation position of the insulating bracket. That is, the ground substrate may be disposed so as to be offset to the side at which the connector does not protrude from the plate-like element so as to adjust the protruding amount of the connector from the plate-like element.

Next, still another example of the plate-like element 10 will be described using FIG. 11. In the above illustrated examples, the plate-like element 10 has basically a flat shape. Further, in the plate-like element 10 of the example of FIG. 10, only the feed part 11 and the leading end part 12 are bent at right angles so as to be erected. However, the present invention is not limited to these and, as illustrated in FIG. 11, a part of the plate-like element may be three-dimensionally formed. FIG. 11 is a schematic perspective view for explaining an example in which the plate-like element of the vehicle antenna device according to the present invention is three-dimensionally formed. In the drawings, the same reference numerals as those in FIG. 1 denote the same parts. As illustrated, the plate-like element 10 has a folded part 15 that is bent so as to be erected and then folded back. More specifically, the leading end of the folded part 15, which is constituted by being bent so as to be erected and then folded back, is connected to the feed point 22 of the ground substrate 20 as the feed part 11. That is, the folded part 15 is three-dimensionally provided at the feed part 11 side. Forming the thus configured folded part 15 allows further adjustment of antenna transmission/reception characteristics. Specifically, horizontal gain can be increased by the presence of the folded part 15. In the illustrated example, the leading end part 12 is connected to the fixing point 23 of the ground substrate 20; however, as the examples illustrated in FIG. 1 and the like, the fixing point 23 need not necessarily be provided.

In the example of FIG. 11, the folded part 15 is a part that is bent first upward and then folded back: however, the erected direction is not limited to this. FIG. 12 is a schematic perspective view for explaining another example in which the plate-like element of the vehicle antenna device according to the present invention is three-dimensionally formed. In the drawings, the same reference numerals as those in FIG. 11 denote the same parts. As illustrated, the folded part 15 of the plate-like element 10 may be bent first downward so as to be erected and then folded back to be connected, at its end, to the feed point 22 of the ground substrate 20 as the feed part 11. That is, the folded part 15 may be three-dimensionally formed such that it is bent downward so as to be erected and then folded back.

Further, although the feed part 11 side is three-dimensionally formed as the folded part 15 in the above illustrated example, the present invention is not limited to this. FIG. 13 is a schematic perspective view for explaining still another example in which the plate-like element of the vehicle antenna device according to the present invention is three-dimensionally formed. In the drawings, the same reference numerals as those in FIG. 11 denote the same parts. The folded part 15 in the illustrated example is a part of the plate-like element 10 that is bent so as to be erected and then folded back, and the end edge of the folded part is connected to the fixing point 23 of the ground substrate 20 as the leading end part 12. That is, the folded part 15 is three-dimensionally provided at the leading end part 12 side. Forming the thus configured folded part 15 allows further adjustment of antenna transmission/reception characteristics as in the above-described example. In the illustrated example, the folded part 15 is bent first downward so as to be erected and then folded back: however, the present invention is not limited to this and, as illustrated in FIG. 11, the folded part 15 may be bent first upward and then folded back. That is, the erected direction is not particularly limited.

Further, in the above illustrated examples, the folded part 15 is provided at the feed part 11 side or leading end part 12 side: however, the present invention is not limited to this. The folded part 15 may be provided at any position of the plate-like element 10 as long as the folded part 15 of the plate-like element 10 is formed by being bent so as to be erected and then being folded back.

Next, yet another example of the folded part 15 will be described using FIG. 14. FIGS. 14A and 14B are schematic views for explaining yet another example in which the plate-like element of the vehicle antenna device according to the present invention is three-dimensionally formed. FIG. 14A is a schematic top view, and FIG. 14B is a schematic perspective view. In the drawings, the same reference numerals as those in FIG. 11 denote the same parts. As illustrated, the plate-like element 10 is configured such that the folded part 15 bent so as to be erected and then folded overlaps a part of the ground part 21 as viewed from above. This allows further adjustment of antenna transmission/reception characteristics by constituting the folded part 15 three-dimensionally formed so as to overlap a part of the ground part 21. Specifically, directivity can be finely adjusted by the folded part 15 that overlaps a part of the ground part 21. In other words, adjustment of the degree of overlap between the folded part 15 and the ground part 21 allows adjustment of directivity.

As described above, according to the vehicle antenna device according to the present invention, it is possible to adjust antenna transmission/reception characteristics with more flexibility by adjusting the line width or shape of the plate-like element 10, adopting the three-dimensional configuration, and adjusting the degree of overlap between the plate-like member 10 and the ground part 21.

In the example illustrated in FIGS. 14, the folded part 15 is obliquely bent and then folded back. However, the present invention is not limited to this and, as illustrated in FIG. 11 and the like, the folded part 15 may be bent at right angles and then folded back. Conversely, the folded part 15 in the examples illustrated in FIG. 11 and the like, which is bent at right angles and then folded back, is illustrated, the present invention is not limited to this, the folded part 15 may be bent obliquely and then folded back as illustrated in FIG. 14.

The vehicle antenna device according to the present invention is not limited to the above examples, but may be variously modified within the scope of the present invention.

The invention claimed is:

1. A vehicle antenna device comprising:

a plate-like element having a feed part and a leading end part, extending with a predetermined line width from the feed part to the leading end part so as to define a blank part at its center as viewed from above, further having an open part extending from the blank part between the feed part and the leading end part, and being configured to transmit and receive signals of a predetermined frequency band; and a ground substrate having a ground part serving as a ground of the plate-like element and a feed point connected with the feed part of the plate-like element and being disposed such that a large part of the ground part does not overlap the plate-like element as viewed from above and does not run off the range defined by the blank part and the open part.

2. The vehicle antenna device according to claim 1, wherein the plate-like element has a C-shape, G-shape, or U-shape.

3. The vehicle antenna device according to claim 1, wherein the ground substrate extends in the open part.

4. The vehicle antenna device according to claim 1, wherein the ground substrate extends in the blank part.

5. The vehicle antenna device according to claim 1, further comprising an insulating bracket having a slide part to which the plate-like element is inserted from the opposite side of the open part of the plate-like element while being slid in parallel to the plate surface of the plate-like element, wherein the ground substrate bridges the open part of the plate-like element so as to prevent the plate-like element from being bent when it is inserted into the slide part while being laterally held.

6. The vehicle antenna device according to claim 5, further comprising a substrate cover covering the ground substrate and fixed to the plate-like element to bridge the open part of the plate-like element so as to prevent the plate-like element from being bent when it is laterally held.

7. The vehicle antenna device according to claim 1, further comprising a connector disposed on the ground substrate and connected with a signal transmission/reception cable, wherein the ground substrate is disposed so as to be offset to the side at which the connector does not protrude from the plate-like element so as to adjust the protruding amount of the connector from the plate-like element.

8. The vehicle antenna device according to claim 1, wherein the plate-like element allows adjustment of signal transmission/reception characteristics in a predetermined frequency band by the line width.

9. The vehicle antenna device according to claim 1, wherein the ground substrate has a fixing point fixed with the leading end part of the plate-like element.

10. The vehicle antenna device according to claim 9, wherein the feed part and leading end part of the plate-like element are bent respectively at right angles so as to be erected, and the bent ends are connected respectively to the feed point and the fixing point of the ground substrate.

11. The vehicle antenna device according to claim 9, wherein the fixing point fixed with the leading end part of the plate-like element is electrically connected to the ground part of the ground substrate.

12. The vehicle antenna device according to claim 9, wherein the fixing point of the ground substrate fixed with the leading end part of the plate-like element is electrically connected to the ground part of the ground substrate through a resistor of a predetermined impedance value.

13. The vehicle antenna device according to claim 9, wherein the ground substrate is designed such that one of the following three options is selectable: the fixing point thereof fixed to the leading end part of the plate-like element is electrically connected to the ground part thereof directly; the fixing point is electrically connected to the ground part through a resistor of a predetermined impedance value; and the fixing point is electrically opened from the ground part.

14. The vehicle antenna device according to claim 9, wherein the plate-like element has a folded part that is bent so as to be erected and then folded back, and the leading end of the folded part which is constituted by being bent so as to be elected and then fold back, is connected to the fixing point of the ground substrate as the leading end part.

15. The vehicle antenna device according to claim 1, wherein the plate-like element has a folded part that is bent so as to be erected and then folded back.

16. The vehicle antenna device according to claim 15, wherein the leading end of the folded part which is constituted by being bent so as to be elected and then fold back, is connected, at its end edge, to the feed point of the ground substrate as the feed part.

17. The vehicle antenna device according to claim 15, wherein the folded part overlaps a part of the ground part as viewed from above.

18. The vehicle antenna device according to claim 1, further comprising another antenna element disposed so as not to overlap the plate-like element as viewed from above and not to run off the range defined by the blank part and the open part.

* * * * *